UNITED STATES PATENT OFFICE.

JAMES ROBINSON HATMAKER, OF PARIS, FRANCE.

DRYING MILK.

No. 920,952.  Specification of Letters Patent.  Patented May 11, 1909.

Application filed June 29, 1906. Serial No. 324,072.

REISSUED

*To all whom it may concern:*

Be it known that I, JAMES ROBINSON HATMAKER, a citizen of the United States, residing at Paris, France, have invented new and useful Improvements in Drying Milk, of which the following is a specification.

My present invention is an improvement in drying milk, whereby pure dry milk of improved quality can be obtained.

Heretofore it has been found necessary to modify natural milk preliminary to drying it as, for example, by adding thereto foreign substances, in order to prevent the proteids of the milk from becoming insoluble during the drying process. All the dry milk heretofore made by exposing liquid milk in a thin layer or film upon a surface heated in excess of 212° F. and reducing it to dryness rapidly has been so insoluble in water that the liquid milk reconstituted from it by the addition of water has shown a large deposit of milk constituents within a few minutes, unless the liquid milk from which it was obtained was reduced in acidity by the addition of some neutralizing agent. This fact is too well known in the art to require further elaboration.

I have discovered that absolutely pure dry milk of practically natural solubility—from which liquid milk most closely resembling natural milk can be reconstituted by the simple addition of warm water—can be obtained from pure fresh milk in its natural state and without its being changed or modified in any way whatever if such natural milk is exposed, in a very thin film, upon a suitably heated surface, for a period not exceeding two and one-half seconds in duration, and thereon reduced to practical dryness and then removed therefrom.

In practice, I prefer that the milk to be dried shall not remain exposed upon the heated drying surface for a longer period than 2 seconds, and it is preferable in some cases that it should not be exposed more than one-half of a second. Generally speaking, in order to get the least possible change in the contained proteids, the exposure should be as short as possible. It is very easy to obtain this exceedingly short exposure by employing rapidly-revolving drying cylinders as the drying surfaces, and I prefer to employ such cylinders, although I do not limit my process in its application to the use of drying cylinders, as flat or otherwise shaped drying surfaces may be used for the purpose. But whatever apparatus is used I prefer to arrange matters so that the exposed film of material is rapidly conveyed over some little distance during its short exposure upon the drying surface, as upon a rapidly revolving drying cylinder.

I am well aware that milk has been dried heretofore upon revolving drying cylinders heated in excess of 212° F., being exposed thereon in a thin film or layer, but the rate of revolution of such cylinders when used for that purpose has been so slow that the film or layer of milk has been exposed thereon much longer than 2½ seconds—usually from 5 to 10 or more seconds. In the cases where milk has been dried on cylinders placed within a vacuum or a partial vacuum the exposure has usually been for a much longer time than 10 seconds. By drying milk by exposing it upon the heated drying surface for less than 2½ seconds, I effect the operation so quickly that chemical action whereby the proteids in milk are rendered insoluble by the known processes, cannot take place. I thus obtain pure dry milk of natural acidity and solubility. I find this process of very limited exposure to be especially valuable also in drying mixtures of milk and other substances such as mixtures of milk and eggs, mixtures of milk and sugar, starch, etc. It is not necessary that the milk to be dried by this process should be previously condensed, although condensed milk can be dried by the process. I prefer to use milk that is absolutely natural and perfectly fresh and that has not been pasteurized or treated physically or chemically in any way. If twin-cylinder drying machines are used, the depth of the milk maintained between them should be kept as low as possible so that it will not be injuriously affected by over-heating.

The process can be executed upon a single drying cylinder, any suitable means being provided for introducing the milk upon the said cylinder in a thin film and for removing it therefrom within the time specified. Knives fixed and held in contact with the cylinder, I have found to be the best means for removing the film therefrom.

The time of exposure is the essence of my present invention. The exposure being so very short the temperature of the drying surface must be maintained above the degree necessary to drive off the water in the exposed film, to the extent desired, within the time specified. The drying should be effected in the free atmosphere and the temperature of the drying surface should be kept above 270° F. In practice I have found cylinders heated by 3¼ atmospheres of steam pressure to give excellent results. The milk being necessarily exposed in a very extended form, as in a thin film, the dry milk obtained is very light and flaky in form. It is distinguishable from the dry milks heretofore made by the fact that it has its natural acidity i. e. the acidity of the natural milk in dry form whereas the dry milk produced from milks which have been reduced in acidity have a lower acidity and a somewhat unnatural taste. This dry milk is not only light and flaky in form and of practically natural solubility but it also has natural acidity and taste. It is also perfectly sterile.

I claim:

1. The hereinbefore described process of drying milk which consists in exposing it in a very thin film, for a period of time not exceeding two and one-half seconds, upon a suitable drying surface heated in excess of 270° F.

2. The hereinbefore described process of drying milk whereby absolutely pure sterile dry milk of practically natural solubility and of natural acidity is obtained, the said process consisting in exposing natural liquid milk, in a very thin film, for a period of time not exceeding two and one-half seconds, upon a suitable drying surface heated in excess of 270° F.

JAMES ROBINSON HATMAKER.

Witnesses:
ALBERT W. SIOUSSA,
HENRY B. SOMMERVILLE.